Dec. 24, 1968  F. D. WERNER ET AL  3,417,606
ELECTRIC DISCHARGE DEVICE
Filed Jan. 11, 1965  2 Sheets-Sheet 1

INVENTORS

FRANK D. WERNER
TENNY D. LODE

Dec. 24, 1968   F. D. WERNER ET AL   3,417,606
ELECTRIC DISCHARGE DEVICE
Filed Jan. 11, 1965   2 Sheets-Sheet 2

INVENTORS

FRANK D. WERNER
TENNY D. LODE

United States Patent Office 3,417,606
Patented Dec. 24, 1968

3,417,606
ELECTRIC DISCHARGE DEVICE
Frank D. Werner, Bloomington, Minn., and Tenny D. Lode, Madison, Wis., assignors to Rosemount Engineering Company, Minneapolis, Minn., a corporation of Minnesota
Filed Jan. 11, 1965, Ser. No. 424,490
8 Claims. (Cl. 73—24)

ABSTRACT OF THE DISCLOSURE

An electrical measurement dependent upon temperature and molecular weight of a gas sample is obtained by providing a periodic electric discharge in a gas sample within a cavity to excite resonant acoustic waves and detecting the resonant frequency through the resulting variation in electrical impedance of an electrical discharge in the gas due to the acoustical vibration.

---

Figure 1:
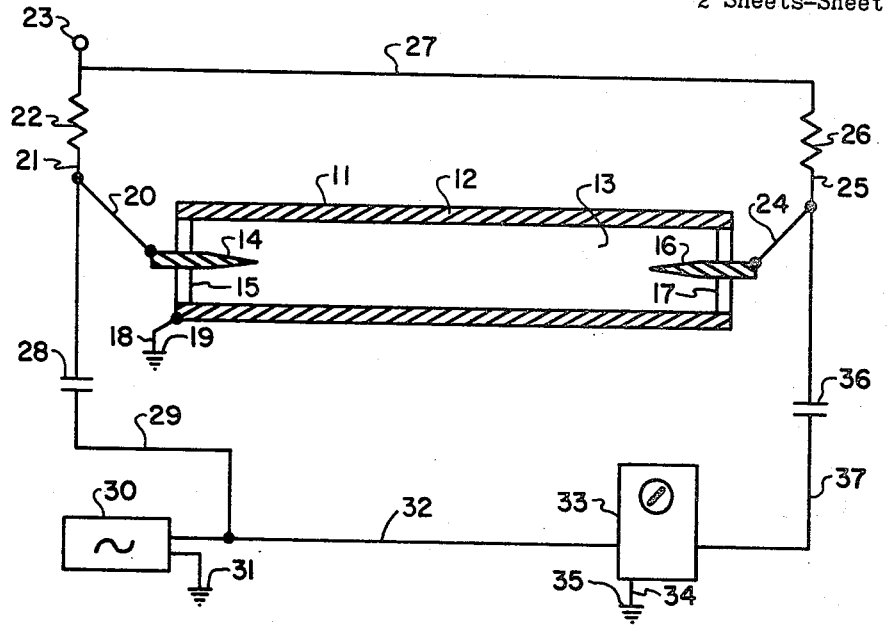

This invention relates to the measurement of the properties of a gas in terms of an acoustical resonant frequency of a chamber containing the gas. More particularly it relates to such measurements in which electrical discharges are employed to excite and sense the acoustical vibrations. Applications of the invention include the measurement of temperature by measuring the acoustical resonant frequency of the chamber, and the implied velocity of sound, in a sample of a known gas, and gas analysis by the similar measurement of the velocity of sound in a sample of unknown gas at a known temperature.

For a so-called perfect gas, the velocity of sound is proportional to the square root of the absolute temperature and inversely proportional to the square root of the average molecular weight. This relationship fails only at extreme high and low temperatures and pressures, at which a gas no longer acts in accordance with the conventional gas laws. For a particular mode of vibration, the resonant frequency of a cavity of a given size will be proportional to the velocity of sound in the gas within the cavity. Hence a resonant frequency of a gas filled cavity may be used to measure temperature if the molecular weight is known, or the average molecular weight if the temperature is known. The advantages of measuring temperatures and/or molecular weights in terms of a frequency include the ease of conversion to digital numbers, the high resolutions obtainable and the extreme accuracy with which frequency may be measured.

The use of the techniques described above for temperature measurement or gas analysis is not new. The variations of the physical properties of gases have long been recognized as a means for the measurement of temperature. The major reason for the infrequent use of gas thermometers has been the difficulty of their use. Acoustical gas thermometers have been constructed in which the resonant frequency of an acoustical chamber is used as a measure of the gas temperature. However, a major difficulty has been the excitation and measurement of acoustic vibration without causing measurement errors or uncertainties. For example, conventional electromechanical transducers, such as moving diaphragm loudspeakers and microphones, may introduce measurement uncertainty because of diaphragm motions which change the apparent dimensions of the cavity.

An object of this invention is the excitation and measurement of acoustic vibrations within a gas filled cavity by electrical means and without mechanically moving elements. Further objects include the use of such excited and measured acoustic vibrations for the measurement of temperature, molecular weight and other quantities.

In a particular form of the present invention two insulated needle electrodes are arranged at opposite ends of a grounded, gas filled, metal, cylindrical chamber. Each electrode is connected to a source of unidirectional high voltage through a high resistance, so as to cause a corona discharge from the electrode tip to the grounded cavity. An additional alternating voltage is applied to a first electrode causing periodic variations of the intensity of the discharge therefrom and the generation of acoustical vibration. The variation of the potential of the second electrode, at an essentially constant discharge current, is used to measure the intensity of the acoustical waves received at the far end of the cavity. The resonant frequency of the cavity is determined by measuring the response of the second discharge electrode to acoustical vibrations excited by the first electrode as a function of frequency.

Figure 2:
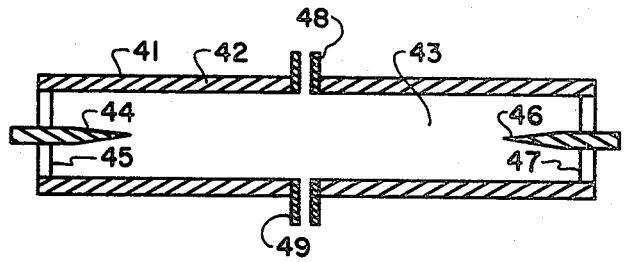
Figure 3:
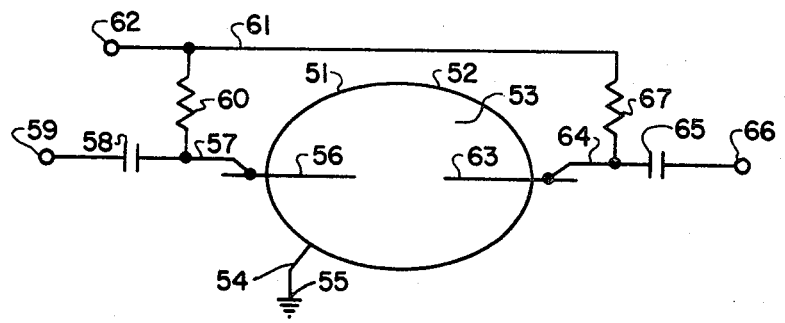
Figure 4:
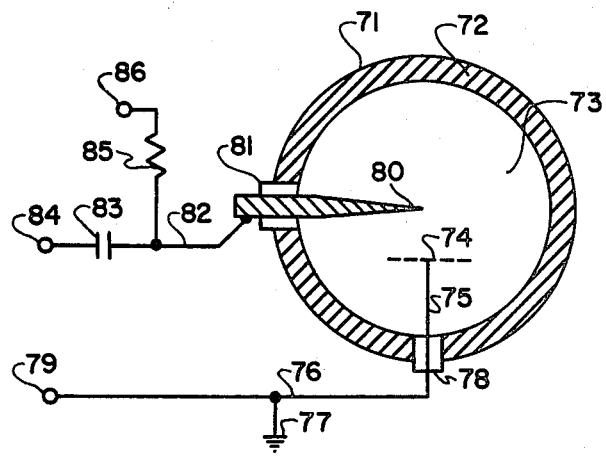

In the drawings:
FIGURE 1 is a section view and schematic illustration of a first form of the invention.
FIGURE 2 is a section view illustrating a modified form of a resonant chamber of the type shown in FIGURE 1;
FIGURE 3 is a schematic illustration of a third form of the invention; and
FIGURE 4 is a section view and schematic illustration of a fourth form of the invention.

Referring now to the drawings, FIGURE 1 includes gas cell 11 with cylinder 12. Cylinder 12 is in the form of a hollow circular metal pipe, and is filled with gas 13 whose characteristics are to be measured. Electrode 14 is supported by insulator 15 at one end of cylinder 12, while electrode 16 is supported by insulator 17 at the other end thereof. Cylinder 12 is connected via line 18 to ground 19. Electrode 14 is connected via line 20 to line 21. Line 21 connects via resistor 22 to high voltage terminal 23. Electrode 16 is connected via line 24 to line 25, which connects in turn via resistor 26 and line 27 to terminal 23. Line 21 connects via capacitor 28 and line 29 to one side of the output of alternating voltage source 30. The second side of source 30 connects to ground 31. The output of source 30 also connects via line 32 to a first input of oscilloscope 33. Oscilloscope 33 is grounded via line 34 to ground 35. Line 25 connects via capacitor 36 and line 37 to a second input of oscilloscope 33.

In use, cylinder 12 is filled with a desired gas 13 at a desired density and sealed. A source of unidirectional high voltage is connected between terminal 23 and ground. Electrodes 14 and 16 are connected to the high voltage through current limiting resistors 22 and 26 respectively. This high voltage will cause a small corona discharge at the tip of each electrode, with current flowing between the needle electrode and cylinder 12. Depending on the geometry and dimensions of cell 11, and the shapes of electrodes 14 and 16, the high voltage required to establish the corona discharges may be of the order of several hundred to several thousand volts. In laboratory experiments with an apparatus of the type shown in FIGURE 1, the magnitude of the voltage applied to terminal 23, and the values of resistors 22 and 26, were chosen so that the heat energy dissipated in the corona discharges did not exceed a few milliwatts. The high voltage source was connected so that terminal 23 was positive with respect to ground, to prevent possible damage to the electrodes through positive ion bombardment. An alternating voltage from source 30 applied through capacitor 28 to electrode 14 will cause the magnitude of the corona discharge from electrode 14 to fluctuate in accordance with the applied AC wave form. The variation of the local heating due to the discharge at the electrode tip will cause relative expansion and contraction of the gas in its vicinity and induce an acoustical vibration. This acoustical vibration will be transmitted to the opposite end of cell 11 near electrode 16. The discharge between electrode 16 and cylinder 12 will be influenced by the pressure and density of the gas in the vicinity of electrode 16. Current limiting resistor 26 will maintain the discharge current through electrode 16 relatively constant in spite of minor variations in the discharge voltage. As acoustical vibrations are excited in cavity 11, a small alternating voltage will appear on electrode 16 as the discharge voltage follows the gas density fluctuations. FIGURE 1 illustrates the use of oscilloscope 33 to measure the amplitude and phase of the alternating voltage signal generated by electrode 16, relative to the signal applied to electrode 14. The relative amplitude and phase of the signal generated on electrode 16 will vary with the frequency of source 30. A maximum response will be observed at a frequency for which the interior length of cell 11 forms a half wave resonant cavity. For a given level of excitation, the signal amplitude on electrode 16 will decrease as the frequency is either increased or decreased from this resonant value. The use of an oscilloscope for such measurements is particularly convenient, as it allows both amplitude and phase relationships to be readily observed. The resonant frequency may also be determined by measuring the relative phase of the alternating voltage components on electrodes 14 and 16. At resonance, these alternating voltage components will be relatively in phase. At frequencies above or below resonance, an appreciable relative phase shift will be observed.

It is thus possible to measure the resonant frequency of a gas filled cavity and the corresponding velocity of sound in the gas without the use of mechanical moving elements. As described previously this knowledge of the resonant frequency of cell 11 may be used to measure temperature with a known gas or the average molecular weight of an unknown gas at a known temperature.

Reference is now made to FIGURE 2 which illustrates a modification of gas cell 11 of FIGURE 1. In FIGURE 2, gas cell 41 includes cylinder 42, which is in the form of a hollow metal pipe, and which encloses gas 43. Electrode 44 is supported by insulator 45 at one end of cylinder 42, while electrode 46 is supported by insulator 47 at the other end. Ports 48 and 49 connect to the interior of cylinder 42.

In the above description of the device illustrated in FIGURE 1, it was assumed that cell 11 was filled and sealed with a desired gas. This will normally be a satisfactory procedure for the measurement of temperature with a known gas. Cell 41 of FIGURE 2 is similar to cell 11 except for the addition of gas ports 48 and 49. These ports allow the convenient introduction of various gases for measurement, without disassembly of cell 41. Cell 41 of FIGURE 2 may be used in a circuit similar to that shown in FIGURE 1.

Reference is now made to FIGURE 3 which illustrates a second form of the invention. For convenience, FIGURE 3 is a schematic illustration, and certain details such as insulators supporting the electrodes are not specifically shown. These details may be, for example, of the general form shown in FIGURES 1 or 2. In FIGURE 3, gas cell 51 includes cavity 52 which contains a gas 53 whose characteristics are to be measured. Cavity 52 is of a conductive material and is connected via line 54 to ground 55. Electrode 56, at one end of cavity 52, is insulated from cavity 52 and is connected via line 57 and capacitor 58 to terminal 59. Line 57 connects via resistor 60 and line 61 to high voltage terminal 62. Electrode 63, at the opposite end of cavity 52, is insulated from cavity 52 and connects via line 64 and capacitor 65 to terminal 66. Line 64 connects via resistor 67 and line 61 to terminal 62.

The structure of FIGURE 3 differs from the structure of FIGURE 1 in the use of an ellipsoidal resonant cavity, and illustrates a generalized procedure for measurement of the characteristics of gas cell 51. The interior cavity of cell 51 is in the shape of a prolate ellipsoid of revolution formed by rotating an ellipse about the axis formed by electrodes 56 and 63. The tips of electrodes 56 and 63 are positioned at the two foci of ellipsoidal cavity 52. Because of the well known properties of an ellipse, an acoustic disturbance at the tip of either electrode will be focused upon the tip of the opposite electrode. Thus, FIGURE 3 illustrates one method for increasing the acoustic coupling between two electrical discharges used for the excitation and sensing of acoustic vibrations within a cavity. The circuit of FIGURE 3 may be substituted for a portion of the circuit of FIGURE 1. For example, terminal 62 may correspond to terminal 23 and terminals 59 and 66 may be connected to lines 29 and 37 respectively. However, the structure of FIGURE 3 may also be considered as a 3 terminal electrical device. The electrical discharge on electrode 56 will present an apparent AC impedance between terminal 59 and ground. Similarly, the discharge on electrode 63 will present an apparent AC impedance between terminal 66 and ground. The coupling between terminals 59 and 66, due to the excitation of acoustic vibration within cell 51, may be viewed as a form of mutual impedance. Hence, the structure of FIGURE 3 may be viewed as a 3 terminal device whose characteristics may be measured by an appropriate mutual impedance instrument. The resonant frequency of cell 51 may be determined by measuring the variation of the apparent mutual impedance as a function of frequency.

Reference is now made to FIGURE 4 which is a section view and schematic illustration of a third form of the invention. In FIGURE 4, gas cell 71 includes spherical cavity 72 containing a gas 73 whose characteristics are to be measured. Screen electrode 74 is connected via lines 75 and 76 to ground 77. Insulator 78 insulates line 75 from cavity 72. Terminal 79 connects via line 76 to ground 77. Electrode 80 is insulated from cavity 72 by insulator 81. Electrode 80 connects via line 82 and capacitor 83 to terminal 84. Line 82 connects via resistor 85 to terminal 86.

The structure of FIGURE 4 differs from the structure of FIGURE 1 in the use of a single electrode for both excitation and sensing of acoustical vibrations within the cavity, and by the establishment of an electrical discharge between two distinct electrodes rather than between one electrode and a conducting cavity wall. The material of cavity 72 of FIGURE 4 may be either conducting or nonconducting. A source of unidirectional high voltage is connected between terminal 86 and ground to establish an electrical discharge between electrode 80 and electrode 74. Electrode 74 may be, for example, in the shape of a woven wire screen to reduce interference with acoustic vibrations within cell 71. The fundamental resonant mode of spherical cavity 72 of FIGURE 4 will be a purely radial mode in which the gas motion is along radials extending from the needle tip. Pressure and density variations within gas 73 will tend to be focused at the tip of electrode 80.

When excited by an alternating voltage across terminals 84 and 79, at a frequency near the acoustical resonant frequency of the cavity, the apparent electrical properties of electrode 80 will change because of the establishment of acoustical standing waves within cavity 72. The structure of FIGURE 4 may be viewed as a two terminal electrical device whose resonant frequency may be determined by measurement of the apparent impedance between terminals 84 and 79 as a function of frequency. This measurement of the resonant frequency of an electromechanical device in terms of the variation of an apparent electrical impedance across two or more terminals is not without precedent. For example, quartz crystals, as used in electrical oscillator circuits, are electromechanical devices which are used as two terminal electrical elements. The characteristics of the structure of FIGURE 4 may be measured with an AC impedance bridge or other suitable impedance measuring means.

In addition to being measured as passive electrical elements, with oscilloscopes, AC bridges, and by other means, structures such as those illustrated may be connected with active circuit elements so as to form oscillators, in a manner resembling the use of quartz frequency control crystals. The oscillation frequency will be controlled by the properties of the acoustical cavity, and the resultant frequency may be taken as a measure of the temperature and/or average molecular weight of the gas in the cavity.

The previous description has assumed the excitation of the corona discharge electrodes with an alternating voltage at the frequency of the desired acoustic vibrations with an additional or biasing unidirectional voltage component. Other electrode excitation techniques may also be employed. For example, deleting resistor 22 of FIGURE 1 and driving electrode 14 with an alternating voltage of one-half an acoustic resonant frequency so as to produce two discharge intensity maximums per cycle, one of each polarity, would yield measurable results. Modulated radio frequency carriers and other forms of excitation which periodically vary the intensity of an electric discharge may also be used to excite acoustical vibrations in a cavity within the spirit of this invention. The above description has disclosed the use of a unidirectional current through a discharge electrode for the sensing of acoustic vibrations. The variation of the impedance of an electrode to a radio frequency discharge current may also be used as a measure of acoustic vibration.

What is claimed is:

1. Means for measuring a property of a gas including means for establishing an electric discharge within the gas, means for alternately varying the intensity of the electric discharge at an acoustic frequency thereby exciting acoustic vibrations within said gas, and means for sensing a variation in impedance of an electric discharge within said gas due to the acoustic vibration within said gas.

2. Means for measurng the properties of a gas within a cavity including means for establishing a first electrical discharge within said cavity, means for establishing a second electric discharge within said cavity, means for periodically varying the intensity of said first discharge thereby exciting acoustic vibrations within said cavity, and means for sensing the variation in the impedance of said second discharge due to acoustic vibration within said cavity.

3. Means for measuring the velocity of sound in a gas in a cavity including first and second corona discharge electrodes within said cavity, means connecting said first electrode to a source of unidirectional voltage thereby establishing a corona discharge upon said first electrode, means connecting said second electrode to a source of unidirectional voltage thereby establishing a corona discharge upon said second electrode, means connecting said first electrode to a source of alternating voltage thereby periodically varying the intensity of the discharge from said first electrode and exciting acoustical vibrations within said cavity, and means responsive to alternating voltages connected to said second electrode to provide a signal dependent upon the velocity of sound in the gas.

4. Apparatus for measuring a property of a gas comprising an enclosure containing a gas sample, electrode means within the enclosure, a source of periodically varying electric potential connected to the electrode means to give an electrical discharge of periodically varying intensity within the gas sample thereby causing acoustic disturbances, and means for sensing the variation of impedance of an electric discharge within the gas sample due to the acoustic disturbances.

5. The apparatus of claim 4 wherein the frequency and phase of the periodically varying potential is selected to reinforce the acoustic disturbances and establish acoustic standing waves within the enclosure.

6. The apparatus of claim 5 wherein the enclosure is substantially spherical and an electrode of the electrode means is positioned at the center of the spherical volume.

7. The apparatus of claim 5 wherein the enclosure defines an interior cavity in the shape of a prolate ellipsoid of revolution and a first electrode of the electrode means is positioned at a first focus of the ellipsoid.

8. The apparatus of claim 7 wherein a second electrode is positioned at a second focus of the ellipsoid, a direct current potential is supplied to each of the first and second electrodes to establish an electric discharge at each electrode, said periodically varying potential is supplied to the first electrode, and the second electrode is connected to said impedance sensing means.

References Cited

UNITED STATES PATENTS 2,950,387   8/1960   Brubaker _____ 73—26

RICHARD C. QUEISSER, *Primary Examiner.*

C. I. McCLELLAND, *Assistant Examiner.*

U.S. Cl. X.R.

324—58.5